US012307886B2

(12) United States Patent
Xu et al.

(10) Patent No.: US 12,307,886 B2
(45) Date of Patent: May 20, 2025

(54) METHOD, APPARATUS, AND SYSTEM FOR TRAFFIC PREDICTION BASED ON ROAD SEGMENT TRAVEL TIME RELIABILITY

(71) Applicant: HERE Global B.V., Eindhoven (NL)

(72) Inventors: Jingwei Xu, Buffalo Grove, IL (US); Yuxin Guan, Chicago, IL (US); Bruce Bernhardt, Wauconda, IL (US); Weimin Huang, Chicago, IL (US); Ian He, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 354 days.

(21) Appl. No.: 17/562,585

(22) Filed: Dec. 27, 2021

(65) Prior Publication Data

US 2023/0206753 A1  Jun. 29, 2023

(51) Int. Cl.
*G08G 1/01* (2006.01)
*G01C 21/36* (2006.01)
*G08G 1/052* (2006.01)

(52) U.S. Cl.
CPC ....... *G08G 1/0129* (2013.01); *G01C 21/3691* (2013.01); *G08G 1/052* (2013.01)

(58) Field of Classification Search
CPC .... G08G 1/0129; G08G 1/052; G08G 1/0133; G08G 1/0141; G08G 1/0112; G08G 1/0145; G01C 21/3691; G01C 21/3492
See application file for complete search history.

(56) References Cited

U.S. PATENT DOCUMENTS

| | | | |
|---|---|---|---|
| 10,557,714 B2* | 2/2020 | Adam | G08G 1/096844 |
| 2011/0184640 A1* | 7/2011 | Coleman | G01C 21/3492 |
| | | | 701/533 |

(Continued)

FOREIGN PATENT DOCUMENTS

| | | |
|---|---|---|
| CN | 109308343 A | 2/2019 |
| CN | 106898142 B | 7/2019 |

(Continued)

OTHER PUBLICATIONS

Johann Lau, "Google Maps 101: How AI helps predict traffic and determine routes", Google, Sep. 3, 2020 (Year: 2020).*

(Continued)

*Primary Examiner* — James M McPherson
*Assistant Examiner* — Kyle J Kingsland
(74) *Attorney, Agent, or Firm* — DITTHAVONG, STEINER & MLOTKOWSKI

(57) ABSTRACT

An approach is provided for traffic data blending based on road segment travel time reliability during traffic prediction. The approach involves, for instance, retrieving real-time traffic information and/or historical traffic information for each road segment within a geographic area. The approach also involves aggregating traffic flow speed data in the real-time traffic information to compute traffic pattern data for each road segment. The traffic pattern data includes static speed data of each said road segment. The approach further involves aggregating traffic flow speed data in the historical traffic information to compute travel time reliability index metric(s) for each said road segment. The approach further involves determining, based on the travel time reliability index metric(s), to use the traffic pattern data, a mean, or a percentile of a road segment travel time distribution in the historical traffic information for traffic prediction associated with each said road segment.

20 Claims, 15 Drawing Sheets

(56) References Cited

U.S. PATENT DOCUMENTS

| | | | | |
|---|---|---|---|---|
| 2013/0317744 A1* | 11/2013 | Mieth | ............... | G08G 1/0141 |
| | | | | 701/533 |
| 2015/0160025 A1* | 6/2015 | Konig | ............... | G01C 21/3415 |
| | | | | 701/410 |
| 2016/0202074 A1* | 7/2016 | Woodard | ............ | G06Q 10/047 |
| | | | | 701/465 |
| 2019/0018426 A1* | 1/2019 | Yao | ...................... | G05D 1/0212 |
| 2020/0111349 A1* | 4/2020 | Mubarek | ............ | G08G 1/0141 |

FOREIGN PATENT DOCUMENTS

| | | |
|---|---|---|
| CN | 111145535 B | 12/2020 |
| WO | 2020151294 A1 | 7/2020 |

OTHER PUBLICATIONS

Wang, Fahui et al. (Estimating O-D travel time matrix by Google Maps API: implementation, advantages, and implications), Annals of GIS, vol. 17, No. 4, Dec. 2011, 199-209. (Year: 2011).*

Alvarez et al., "Time-Variant Travel Time Distributions and Reliability Metrics and Their Utility in Reliability Assessments", Research Article, Jan. 1, 2012, vol. 2315 issue: 1, 14 pages.

* cited by examiner

200

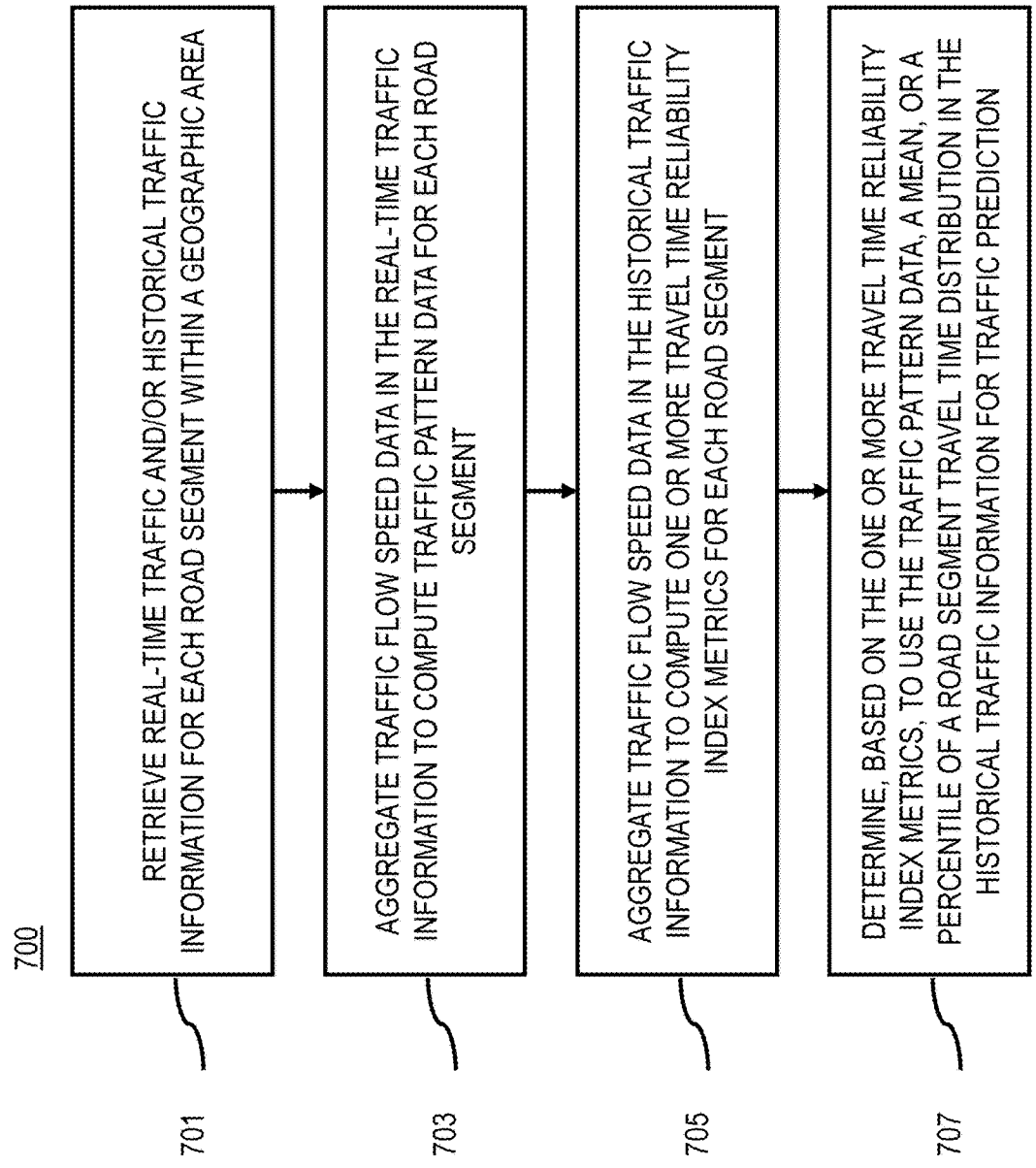

METHOD, APPARATUS, AND SYSTEM FOR TRAFFIC PREDICTION BASED ON ROAD SEGMENT TRAVEL TIME RELIABILITY

BACKGROUND

Mapping and navigation service providers face significant technical challenges with respect to determining and mapping dynamic traffic conditions within a road network. One particular challenge is with respect to combine ("blending" or "fusion") different data sources and/or data types with algorithms to estimate current traffic conditions for traffic prediction. To predict the traffic, the common approach is to blend real time traffic data with traffic pattern data using an weight-assigning algorithm. After a certain time period, the traffic pattern data will have a full weight to be served in the traffic prediction. A quality assurance program is usually used to determine and control the effects of blending are acceptable for performance management. As autonomous driving become popular that drives demand for higher quality traffic prediction, mapping and navigation service providers continue to develop technical solutions to enhance traffic prediction, including traffic data blending.

SOME EXAMPLE EMBODIMENTS

Therefore, there is a need for enhancing traffic prediction, including traffic data blending, using techniques such as Travel Time Reliability (TTR) to ensure the traffic prediction data is accurate and of high-quality.

According to one embodiment, a method comprises retrieving real-time traffic information, historical traffic information, or a combination thereof for each road segment within a geographic area. The method also comprises aggregating traffic flow speed data in the real-time traffic information to compute traffic pattern data for each road segment. The traffic pattern data includes static speed data of said each road segment. The method further comprises aggregating traffic flow speed data in the historical traffic information to compute one or more travel time reliability index metrics for said each road segment. The method further comprises determining, based on the one or more travel time reliability metrics, to use the traffic pattern data, a mean, or a percentile of a road segment travel time distribution in the historical traffic information for traffic prediction associated with said each road segment.

According to another embodiment, an apparatus comprises at least one processor, and at least one memory including computer program code for one or more computer programs, the at least one memory and the computer program code configured to, with the at least one processor, cause, at least in part, the apparatus to retrieve real-time traffic information, historical traffic information, or a combination thereof for each road segment within a geographic area. The apparatus is also caused to aggregate traffic flow speed data in the real-time traffic information to compute traffic pattern data for each road segment. The traffic pattern data includes static speed data of said each road segment. The apparatus is further caused to aggregate traffic flow speed data in the historical traffic information to compute one or more travel time reliability index metrics for said each road segment. The apparatus is further caused to determine, based on the one or more travel time reliability metrics, to use the traffic pattern data, a mean, or a percentile of a road segment travel time distribution in the historical traffic information for traffic prediction associated with said each road segment.

According to another embodiment, a non-transitory computer-readable storage medium carries one or more sequences of one or more instructions which, when executed by one or more processors, cause, at least in part, an apparatus to retrieve real-time traffic information, historical traffic information, or a combination thereof for each road segment within a geographic area. The apparatus is also caused to aggregate traffic flow speed data in the real-time traffic information to compute traffic pattern data for each road segment. The traffic pattern data includes static speed data of said each road segment. The apparatus is further caused to aggregate traffic flow speed data in the historical traffic information to compute one or more travel time reliability index metrics for said each road segment. The apparatus is further caused to determine, based on the one or more travel time reliability metrics, to use the traffic pattern data, a mean, or a percentile of a road segment travel time distribution in the historical traffic information for traffic prediction associated with said each road segment.

In addition, for various example embodiments described herein, the following is applicable: a computer program product may be provided. For example, a computer program product comprising instructions which, when the program is executed by a computer, cause the computer to perform any one or any combination of methods (or processes) disclosed.

According to another embodiment, an apparatus comprises means for retrieving real-time traffic information, historical traffic information, or a combination thereof for each road segment within a geographic area. The apparatus also comprises means for aggregating traffic flow speed data in the real-time traffic information to compute traffic pattern data for each road segment. The traffic pattern data includes static speed data of said each road segment. The apparatus further comprises means for aggregating traffic flow speed data in the historical traffic information to compute one or more travel time reliability index metrics for said each road segment. The apparatus further comprises means for determining, based on the one or more travel time reliability metrics, to use the traffic pattern data, a mean, or a percentile of a road segment travel time distribution in the historical traffic information for traffic prediction associated with said each road segment.

In addition, for various example embodiments described herein, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application.

For various example embodiments described herein, the following is also applicable: a method comprising facilitating access to at least one interface configured to allow access to at least one service, the at least one service configured to perform any one method/process or any combination of network or service provider methods (or processes) disclosed in this application.

For various example embodiments described herein, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application.

For various example embodiments described herein, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a flowchart of a process for traffic data blending based on road segment travel time reliability during traffic prediction, according to one embodiment;

DESCRIPTION OF SOME EMBODIMENTS

Examples of a method, apparatus, and computer program for traffic data blending based on road segment travel time reliability during traffic prediction are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
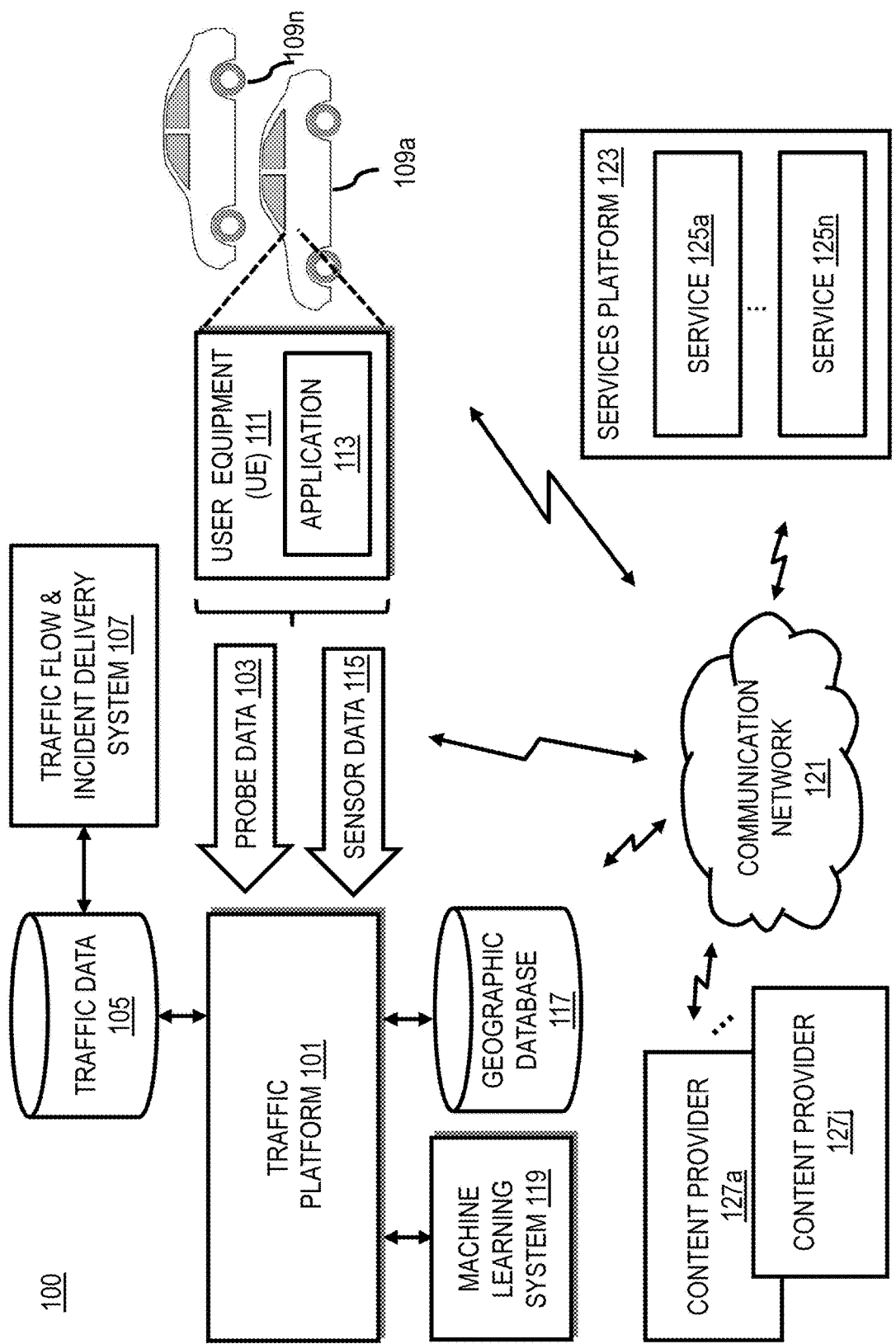
FIG. 1 is a diagram of a system capable of traffic data blending based on road segment travel time reliability during traffic prediction, according to one embodiment.

FIG. 1 is a diagram of a system capable of traffic data blending based on road segment travel time reliability during traffic prediction, according to one embodiment.

Travel Time Reliability (TTR) is widely used to measure the extent of an unexpected delay and to evaluate transportation system performance. TTR is defined by US Federal Highway Administration (FHWA) as "the consistency or dependability in travel times, as measured from day-to-day and/or across different times of the day". According to FHWA, TTR measures are used by entities for following purposes. In Level 1, TTR measures (e.g., Buffer Index (BI)) are used by upper management, public relations, and planners to determine travel conditions (e.g., reliable, unreliable, etc.). In Level 2, TTR measures that indicate delay by source (e.g., vehicle-hour) are used by mid-management, operators, and planners to determine cause(s) of unreliable travel, such as work zones, weather, special events, incidents, traffic control, demand variability, and lack of base capacity. In Level 3, operators and field managers develop activities, policies, and procedures based on the TTR measures and/or the delay cause(s) to determine what aspects of operations, management, and construction need to be improved.

In one embodiment, the system 100 can use TTR together with traffic pattern data and real time traffic data for traffic prediction service enhancement. Such real time traffic data can be directly received from probes (such as vehicles 109, UE 111, etc.), or from a data aggregator (e.g., an OEM traffic data platform). The data from the data aggregator may be stale "real-time" data (e.g., from the past 20-min, hour, etc. depending on an aggregating/publishing cycle). In one embedment, for each road segment, the system 100 can calculate the historical travel time statistical distribution to create different traffic travel time reliability evaluation metrics. The system 100 can then use these metrics to decide whether or not, the traffic pattern data should be used as traffic prediction data after a certain time period.

Figure 2:
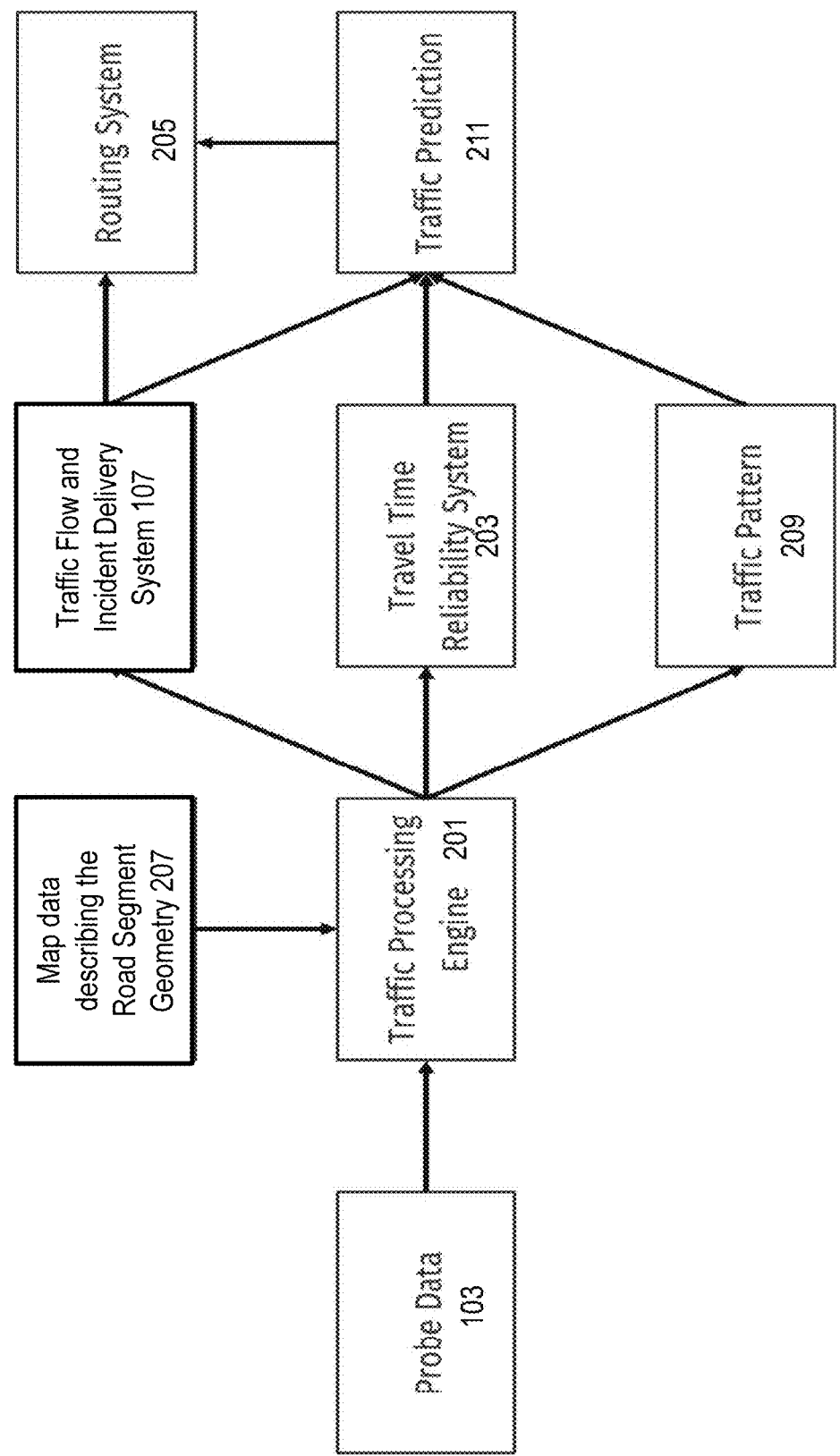
FIG. 2 is a diagram of components of a traffic platform capable of traffic data blending based on road segment travel time reliability during traffic prediction, according to one embodiment.

FIG. 2 is a diagram of a traffic data processing flow 200 using map data and probe data, according to one embodiment. To accurately estimate travel time using traffic flow data, the system 100 has a traffic processing engine 201 that can generate traffic pattern data (i.e., a static speed data for each road segment) without the detailed road segment travel time distribution information. Instead of blending real time traffic data and the traffic pattern data and then falling back to the traffic pattern data after certain time period, the system 100 can selectively use the traffic pattern data, a mean, or a percentile, or similar statistic of a road segment travel time distribution in historical traffic information for accurate traffic prediction.

For instance, the traffic processing engine 201 can archive and aggregates real-time traffic flow information to create traffic pattern data for each road segment. For example, the traffic processing engine 201 can take probe data 103 collected by probes (e.g., vehicles 109, UE 111, etc.) as input and map-match the probe data 103 with map data 207 describing road segment geometry (e.g., retrieved from a geographic database 117) to generate traffic data 105 including real-time traffic flow and incident information and traffic pattern data 209. The traffic data 105 can be output to a traffic flow and incident delivery system 107 for broadcasting. The vehicles 109 can be autonomous vehicles, semi-autonomous vehicles, etc.

In one embodiment, the traffic pattern data 209 includes an expected speed value provided in 15 minute intervals of a road segment (e.g., a motorway or arterial road) for a typical day. In another embodiment, the traffic processing engine 201 can identify contiguous set of road segments and time intervals which have the largest statistically significant relevance in forming traffic patterns. For instance, the traffic pattern data 209 can be created using billions of GPS probe points from multiple years, which is aggregated, verified and then geo-referenced to TMC Codes or Link IDs in the geographic database 117. Traffic Patterns provides the foundation for alternate route features and more accurate drive time estimates for logistics and navigation products.

The traffic flow and incident delivery system 107 can deliver real time traffic flow and incident information in different formats to support a service platform 123, one or more services 125a-125n, (also collectively referred to as services 125), and/or one or more content providers 127a-127j (also collectively referred to as content providers 127). For example, the real-time traffic flow and incident information can be transmitted to a routing system 205 for vehicle navigation. The routing system 205 can then take traffic prediction information and real time traffic flow information for routing services.

Figure 3A:
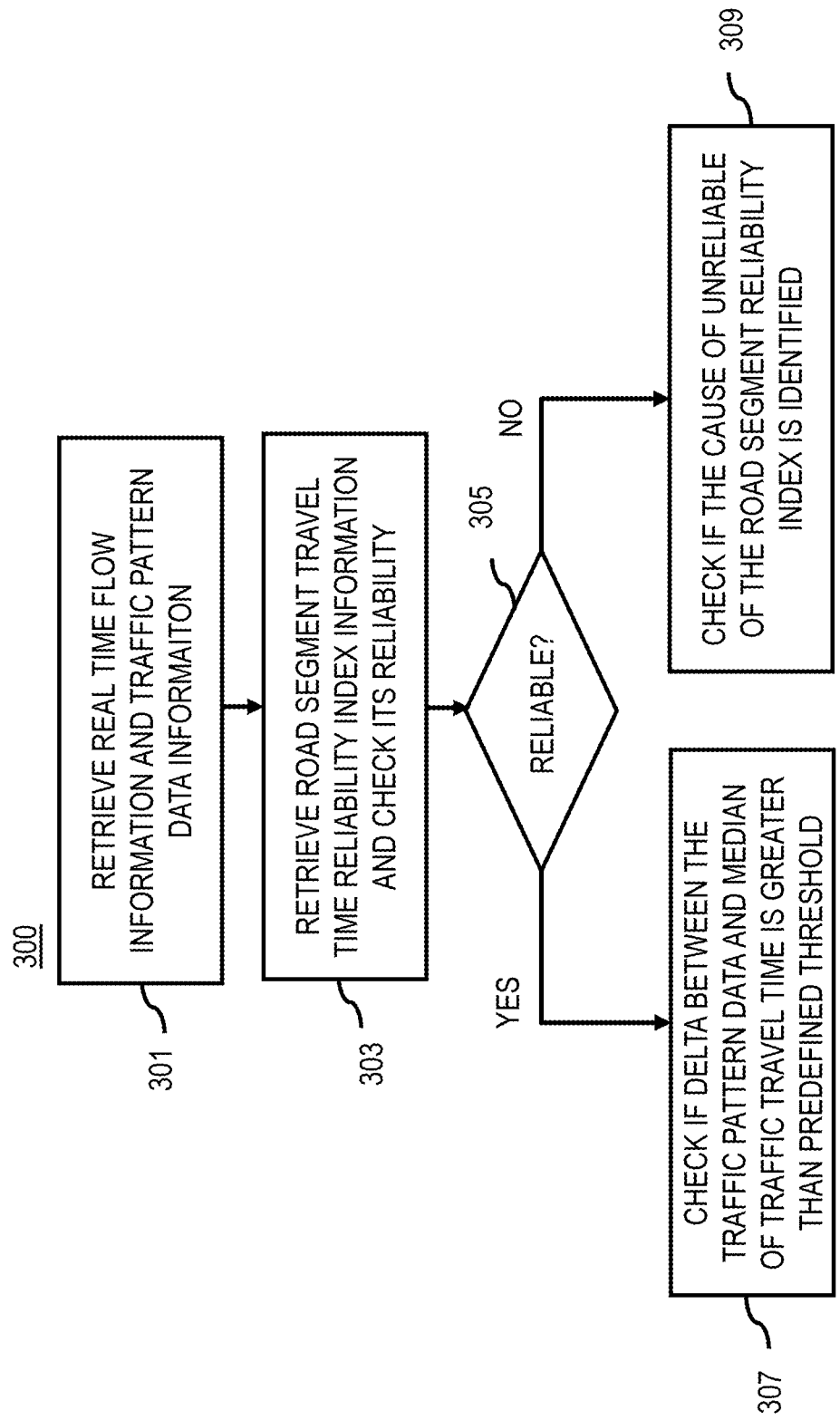
FIGS. 3A-3C constitute a flowchart of a process for traffic data blending based on road segment travel time reliability during traffic prediction, according to one embodiment.
Figure 3B:
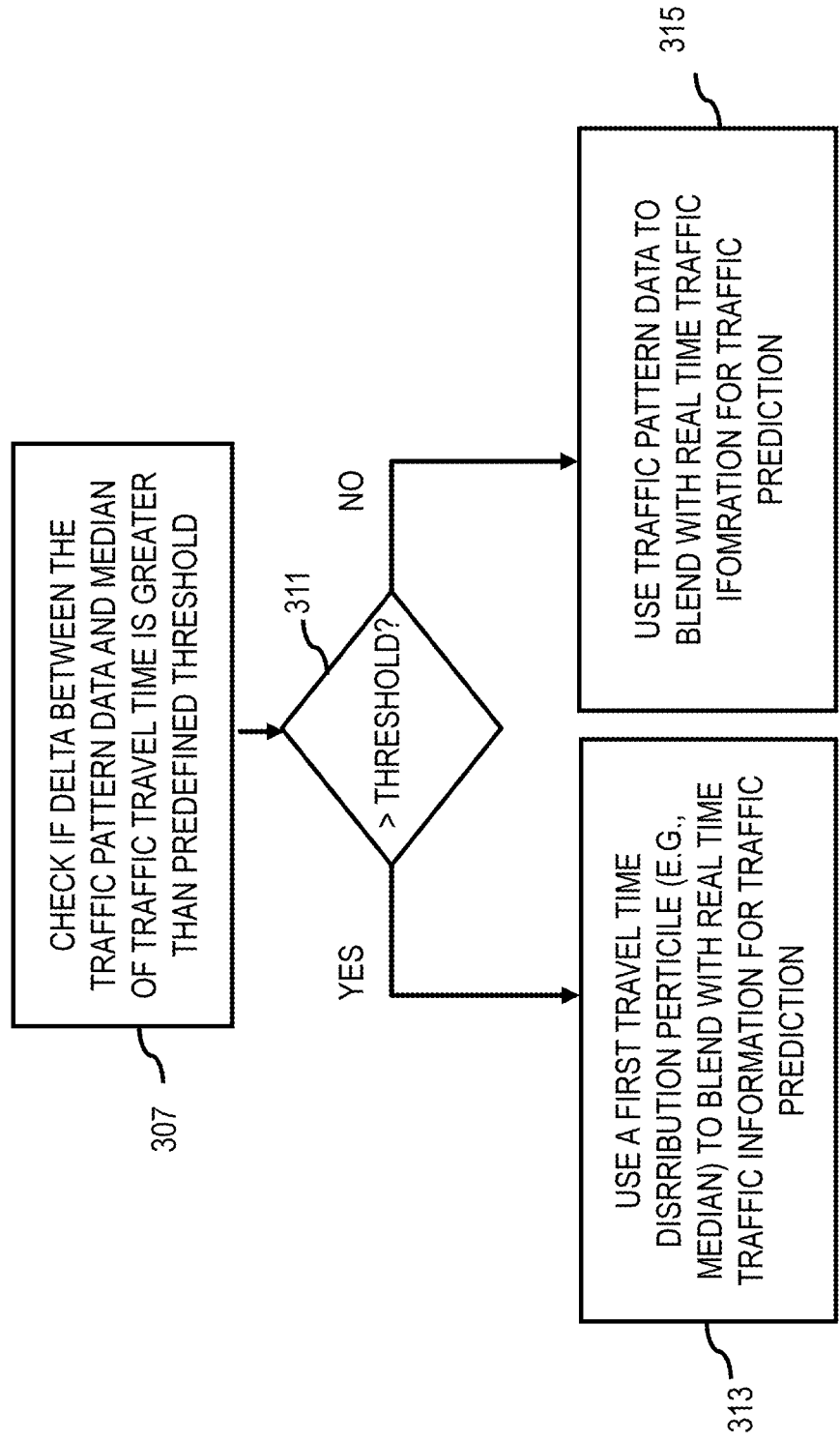
Figure 3C:
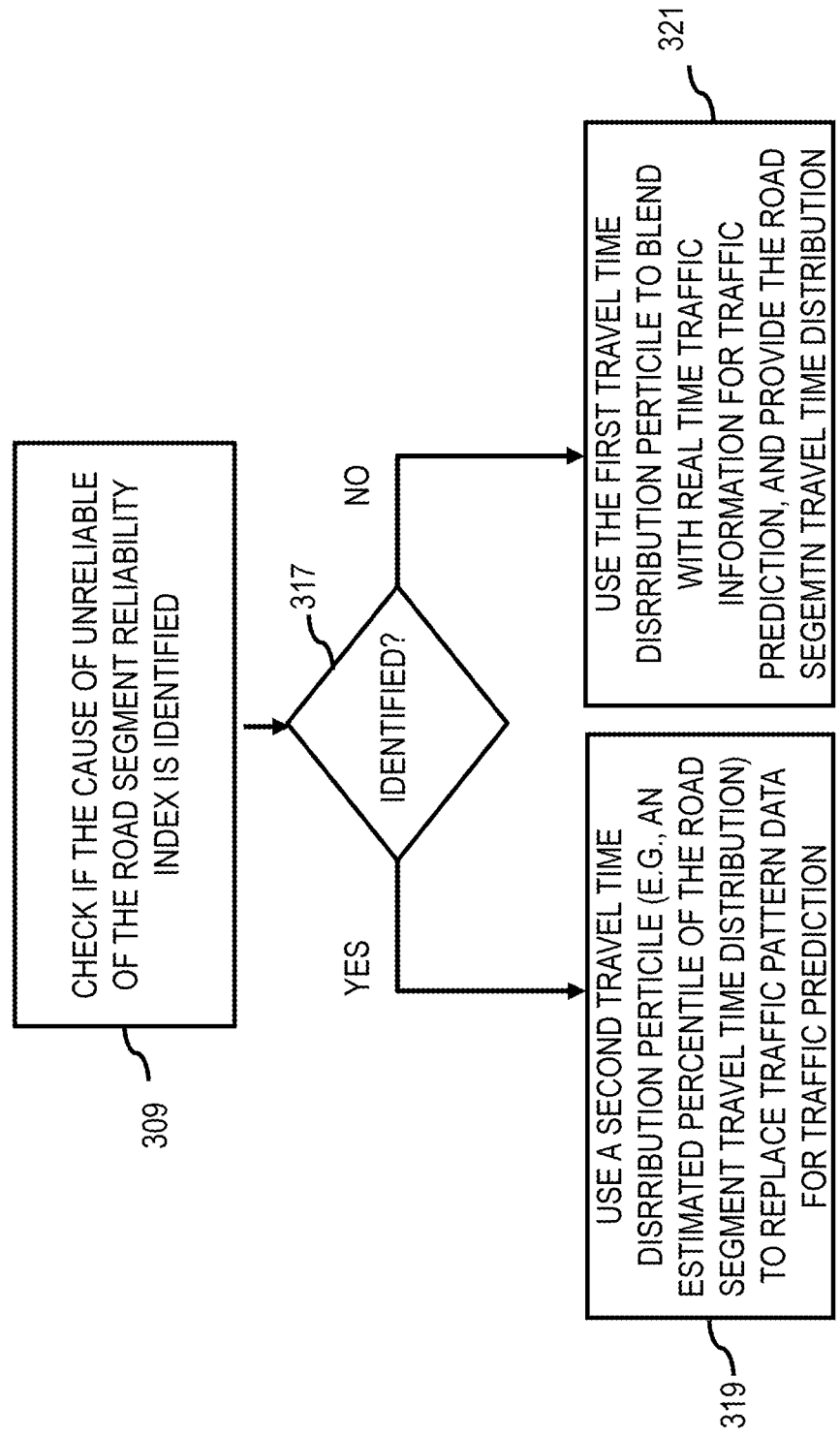

The traffic data 105 can be output to the travel time reliability system 203 for traffic data blending during traffic prediction 211 based on, for example, the flowchart in FIGS. 3A-3C. For instance, the travel time reliability system 203 can aggregate historical traffic travel time data to compute travel time reliability index metrics for each road segment, then decide how to blend real-time traffic information, traffic pattern data, traffic travel time reliability data to predict future traffic information per certain time period (e.g., 2-hour, 4-hour, 8-hour, one day, etc.).

In one embodiment, the probe data 103 may be reported as probe points, which are individual data records collected at a point in time that records telemetry data for that point in time. A probe point can include attributes such as: (1) probe ID, (2) longitude, (3) latitude, (4) elevation, (5) heading, (6) speed, and (7) time. The list of attributes is provided by way of illustration and not limitation. For example, attributes such as tilt, steering angle, wiper activation, etc. can be included and reported along with a probe point. In one embodiment, the vehicles 109 may include vehicle sensors for reporting sensor data 115. The attributes can also be any attribute normally collected by an on-board diagnostic (OBD) system of the vehicle 109, and available through an interface to the OBD system (e.g., OBD II interface or other similar interface).

FIGS. 3A-3C constitute a flowchart of a process 300 for traffic data blending based on road segment travel time reliability during traffic prediction, according to one embodiment. In step 301 of FIG. 3A, the system 100 can retrieve available real-time and historical traffic information per each road segment (e.g., in a traffic message channel (TMC)). There are many industrial traffic data exchange standards, such as Datex II, radio data system (RDS) traffic message channel (TMC), TPEG TEC, cooperative awareness message (CAM), decentralized environmental notification message (DENM), etc. For instance, the system 100 can leverage different traffic information sources to provide a foundation for traffic services from a variety of devices across the globe. Sources of traffic information can include traffic control centers, camera systems, traffic speed detectors, floating car data, winter driving reports, roadwork reports, police, etc. The traffic information can include map artifact attributes, weather information, a traffic real-time flow, a traffic real-time incident, a road closure and construction, traffic historical pattern information, un-predictable event information, etc.

TMC can deliver traffic information to display on a UE 111 without interrupting audio broadcast services. When the traffic information is integrated directly into a navigation system, the system 100 can use the traffic information for route calculation. For instance, a traffic message channel (TMC) message can include an event code, a location code, an expected incident duration, an affected extent, etc. TMC can deliver traffic and travel information to motor vehicle that is digitally coded using the ALERT C or TPEG protocol into RDS Type 8A groups carried via conventional FM radio broadcasts. For example, a TMC/Alert-C message can include elements listed in Table 1:

TABLE 1

PI code => Program Identification
Group code => message type identification
B0 => version code
TP => Traffic Program
PTY => Program Type
T, F, D => Multi Group messages
DP => Duration and Persistence
D => Diversion Advice
PN => +/−direction
Extent => event extension
Event => event code (see TMDD—Traffic Management Data Dictionary)
Location => location code (DAT Location Table - TMCF-LT-EF-MFF-v06)

For instance, the system 100 can aggregate traffic flow speed data back to a predefined time period (e.g., one year) for each road segment (e.g., in TMC, Link, Dynamic Location Referencing (DLR), etc.) per predefined time window labelling (e.g., Weekday AM Peak (6 am to 10 am), Weekday Midday (10 am to 4 pm), Weekday PM Peak (4 pm to 8 pm), Weekend (6 am to 8 pm), etc.). The system 100 then calculate the mean, median, 80%, or 95% percentile of a road segment travel time distribution per road segment within each time window, and compute different travel time reliability indexes as metrics of different time windows, such as listed in Table 2.

TABLE 2

Figure 4:
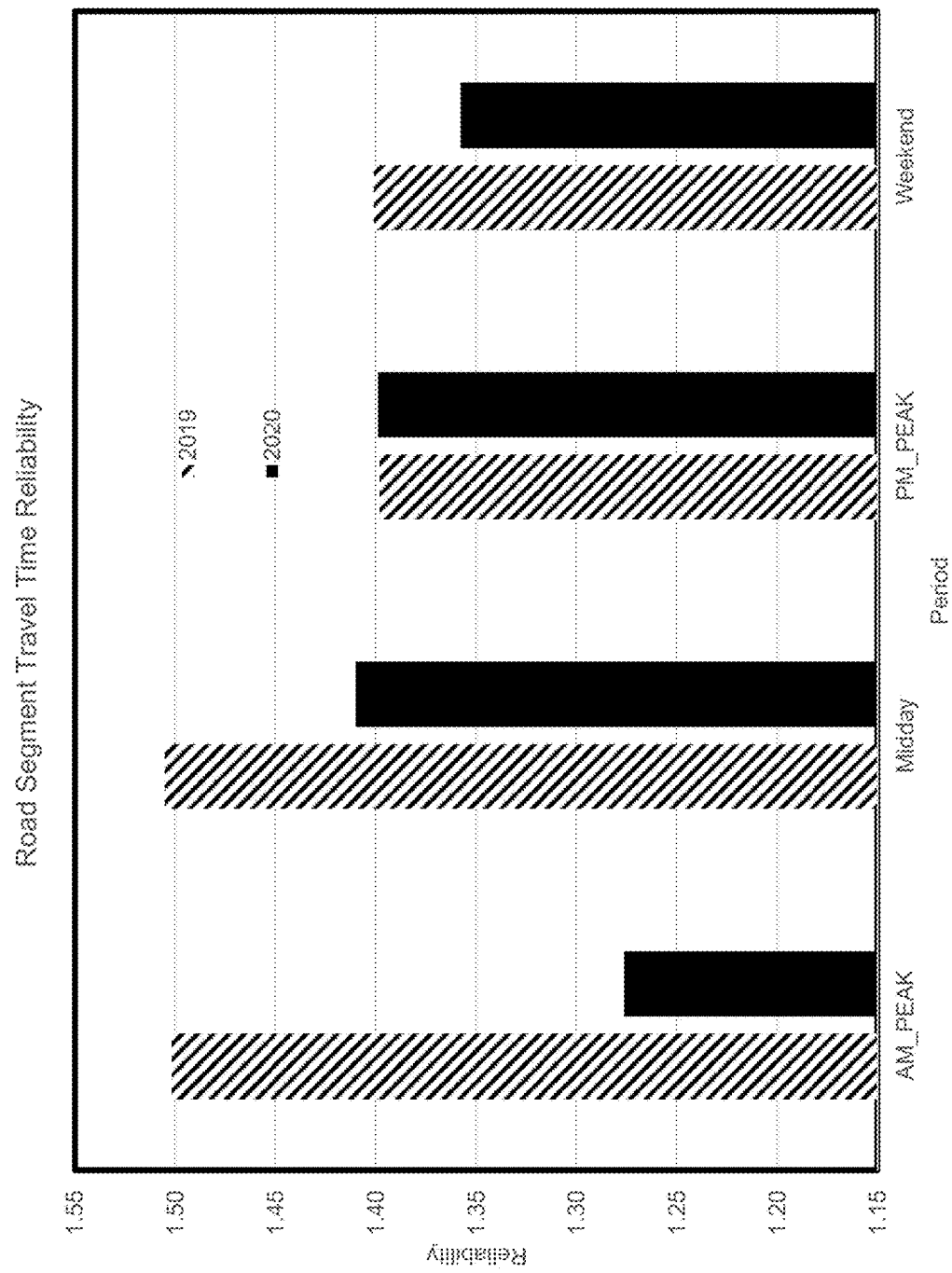
FIG. 4 is a diagram showing example road segment travel time reliability index per vehicle or vehicle group, according to one embodiment.

Buffer Index (BI): The difference between the 95th percentile travel time and the average travel time, normalized by the average travel time.
Failure/On-Time Performance: Percent of trips with travel times less than:
1.1* median travel time
1.25* median travel time TABLE 2-continued 95th Planning Time Index: 95th percentile of the travel time index distribution 80th Percentile Travel Time Index: 80th percentile of the travel
time index distribution
Skew Statistics: The ratio of 90th percentile travel time minus the median travel time divided by the median travel time minus the 10th travel time percentile
Misery Index: The average of the highest five percent of travel times divided by the free-flow travel time.
Coefficient of variation (COV): Standard deviation/Average travel time
Frequency of congestion (FOC): Frequency of trips exceeding a threshold value
Percent variation: Standard deviation/Average travel time × 100%
Variability index: Difference in-peak period confidence intervals/Difference in off peak period confidence intervals In step 303, the system 100 can retrieve road segment travel time reliability index information. For instance, FIG. 4 is a diagram showing example road segment travel time reliability index per vehicle or vehicle group, according to one embodiment. The road segment reliability indexes were calculated using one or more of the indexes (e.g., Buffer Index, percent variation, etc.) listed in Table 2 and compared between 2019 and 2020 during different time windows: Weekday AM Peak (6 am to 10 am), Weekday Midday (loam to 4 pm), Weekday PM Peak (4 pm to 8 pm), and Weekend (6 am to 8 pm) in FIG. 4 reflect the changes due to COVID-19, e.g., in the morning and midday periods, the road network is more reliable because of less congestion times due to COVID-19 changes (reductions) of commuter travel. A larger number indicates a less reliable condition.

Figure 5:
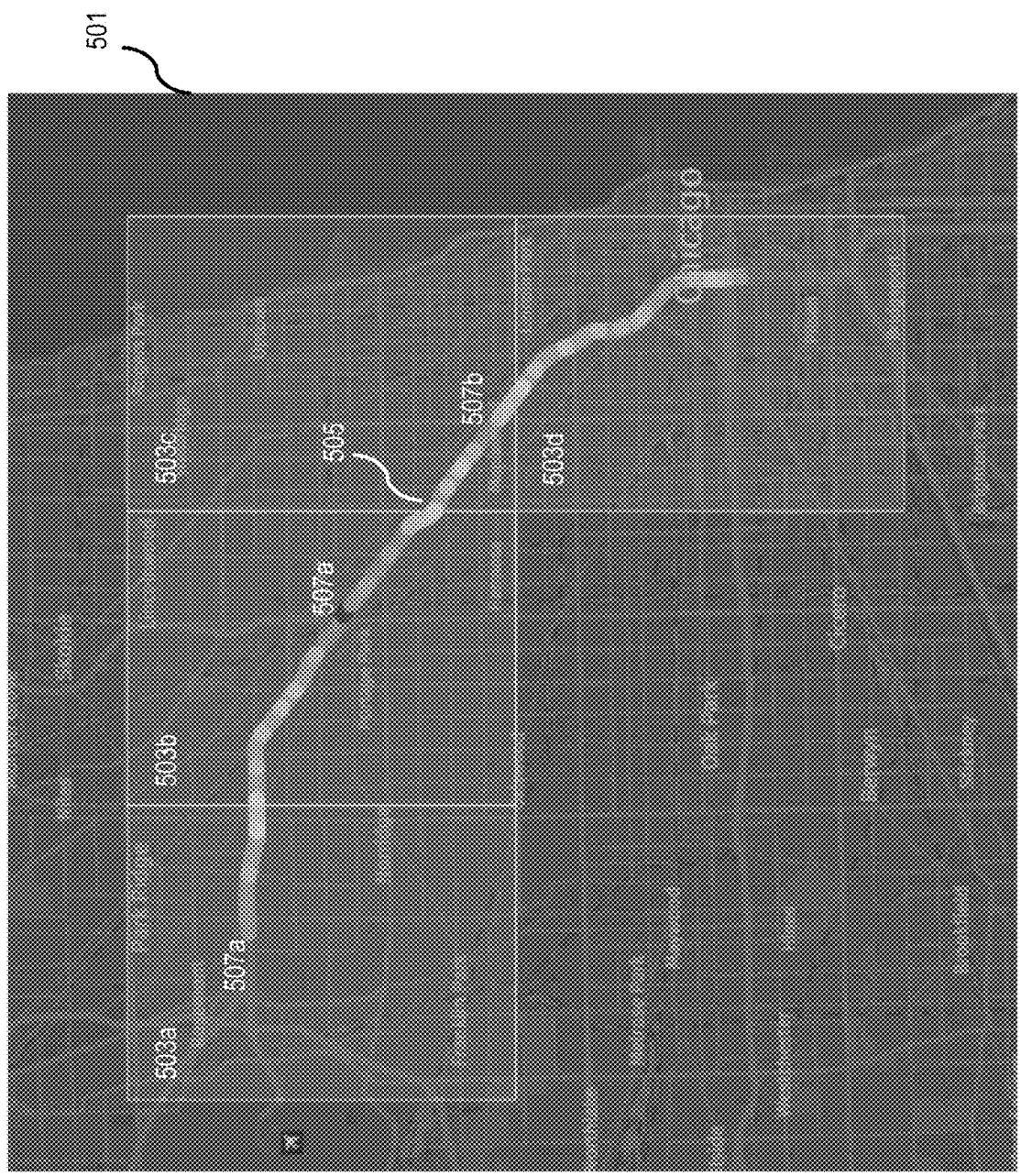
FIG. 5 is a diagram showing example road segment travel time reliability index per route, according to one embodiment.

As another instance, FIG. 5 is a diagram showing example road segment travel time reliability index per route, according to one embodiment. FIG. 5 shows a map 501 with map tiles 503 and road segment travel time reliability index on a route 505 calculated using one of the indexes (e.g., Buffer Index) listed in Table 2. In FIG. 5, the route 505 extends via 4 map tiles 503a-503d. The gray scale represents how reliable each road segment travel time is in a predefined time period (e.g., one year of traffic flow data). Black/dark color means the road segment travel time index on a road segment (e.g., a road segment 507a) is not reliable. While/bright color means the road segment travel time index on a road segment (e.g., a road segment 507b) is more reliable. The gray color means the road segment travel time index on a road segment (e.g., a road segment 507c) is in between unreliable and reliable. The road segment travel time reliability index per route can be used for traffic prediction as follows.

In step 305, the system 100 can determine whether the road segment travel time reliability index information is reliable. If yes, in step 307, the system 100 can check whether a delta/difference between the traffic pattern data and a median (i.e., 50% percentile) of a road segment travel time distribution is greater than a predefined threshold. If no, in step 309, the system 100 can check whether the root cause of unreliable of the road segment reliability index is identified.

The step 307 continues to FIG. 3B. When the delta/difference is greater than the predefined threshold as determined in step 311, the system 100 can use the first travel time distribution percentile (e.g., median) to blend with the real time traffic information for traffic prediction in step 313. When the delta/difference is equal to or smaller than the predefined threshold as determined in step 311, the system 100 can use the traffic pattern data to blend with the real time traffic information for traffic prediction in step 315. In other words, the system 100 blends the real time traffic information with the traffic pattern data when the road segment travel time reliability is reliable. In case the delta between the traffic pattern data and the median of the road segment travel time distribution exceeds the threshold, the system 100 use the median to replace the traffic pattern data in the traffic prediction.

The step 309 continues to FIG. 3C. When the root cause of unreliable of the road segment reliability index is identified as determined in step 317, the system 100 can use a second travel time distribution percentile (e.g., an estimated travel time distribution percentile of the road segment, e.g., 80%, 95%, etc.) to blend with the real time traffic information for traffic prediction, and provide travel time statistical distribution information (e.g., the road segment travel time distribution) in step 319. When the root cause of unreliable of the road segment reliability index is not identified as determined in step 317, the system 100 can use the first percentile (e.g., median) of the road segment travel time distribution to replace traffic pattern data for traffic prediction in step 321. In other words, if the road segment reliability index is not reliable, the system 100 can provide the statistical distribution information (e.g., the road segment travel time distribution) while replacing the traffic pattern data with the median or another percentile of the road segment travel time distribution in traffic prediction services. When the traffic pattern data is unreliable, instead of trying to provide a precise estimate, the system 100 can provide a distribution based on how unreliable the traffic pattern data is. For example, if the traffic pattern data is reliable for the road segment, the estimate can be say for a 30 minute travel time. If the traffic pattern data is barely unreliable for the road segment, the estimate can be for say 30 minutes/−3 minutes. If the traffic pattern data is very unreliable for the road segment, the estimate can be for 30+/−8 minutes.

In another embodiment, when the traffic pattern data is unreliable, a travel time distribution range of the road segment travel time distribution can be used as an alternative to mean or median. For instance, for some road segment(s), the travel time(s) could be in a range of [5, 20] with unit minutes for ETA prediction for vehicles driving through such road segment(s). In case the root cause of the unreliability of the road segment reliability index is known, e.g., weather, road construction, etc., the system 100 can use other percentiles to replace the traffic pattern data in traffic prediction service.

After determining how to blend traffic data for traffic prediction 211 based on the flowchart in FIGS. 3A-3C, the system 100 can predict traffic based on the blended traffic data, such as ingests real-time traffic information (e.g., real-time probe data in the probe data 103), blending the traffic pattern data, a mean, or a percentile of a road segment travel time distribution as determined via the process 300 per road segment, thereby determining a current travel speed for a given road segment (e.g., a road link or TMC). Based on the current travel speed, the system 100 can determine an output speed category of the current travel speed for road segment, as free flow, queueing, stationary, . . . etc. From a user perspective, a driving speed equal to or lower than a queueing speed would be considered as road congestion. The current travel speed data, traffic feeds along with other attributes, etc. can be fed into the routing system 205 for ETA (estimate time of arrival) calculation (route-based approach) as the following equation (1):

$$ETA_{route} = \sum_{i=1}^{n} t_{link}^{i} + t_{transition}^{i,i+1}$$

$t_{link}^{i}$: estimated travel time on link i using the traffic information.

$t_{transition}^{i,i+1}$: transition cost from link i to link i+1

The system 100 can estimate an accurate ETA based on an accurate travel time for each road segment and a transition time between the two adjacent connected road segments based the blended traffic data. For instance, the system 100 can continuously update the traffic prediction every 60 seconds through dynamic content feeds (e.g., XML, feed). The selectively blending of real-time traffic information with the traffic pattern data, a mean, or a percentile of a road segment travel time distribution in the historical traffic information can enhance traffic prediction by using accurate information (e.g., the traffic pattern data) where it is known to be reliable while providing a range of estimates for road segments that demonstrate a larger variation or uncertainty as discussed. In other words, the system 100 can selectively apply traffic pattern data for different road segments based on respective road segment travel time reliability index (e.g., as a confidence level). Therefore, the system 100 can avoid error traffic pattern data given in unreliable situations as discussed scenarios of using an estimation range or median, while providing the heuristic knowledge (e.g., the traffic pattern data) when it is reliable.

In another embodiment, the system 100 can use sensor data 115 (including vehicle telemetry or operational data) in place of or in conjunction with the probe data 103 for traffic prediction, for instance, via integrating with real-time traffic information, weather, and road conditions (e.g., potholes, road friction, road wear, etc.) with highly detailed 3D representations of street and geographic features to provide real-time also accurate traffic prediction.

The above-discussed embodiments improve traffic prediction services, middle mile and last mile services, ETA and routing services for transportation logistics use cases, etc.

Figure 6:
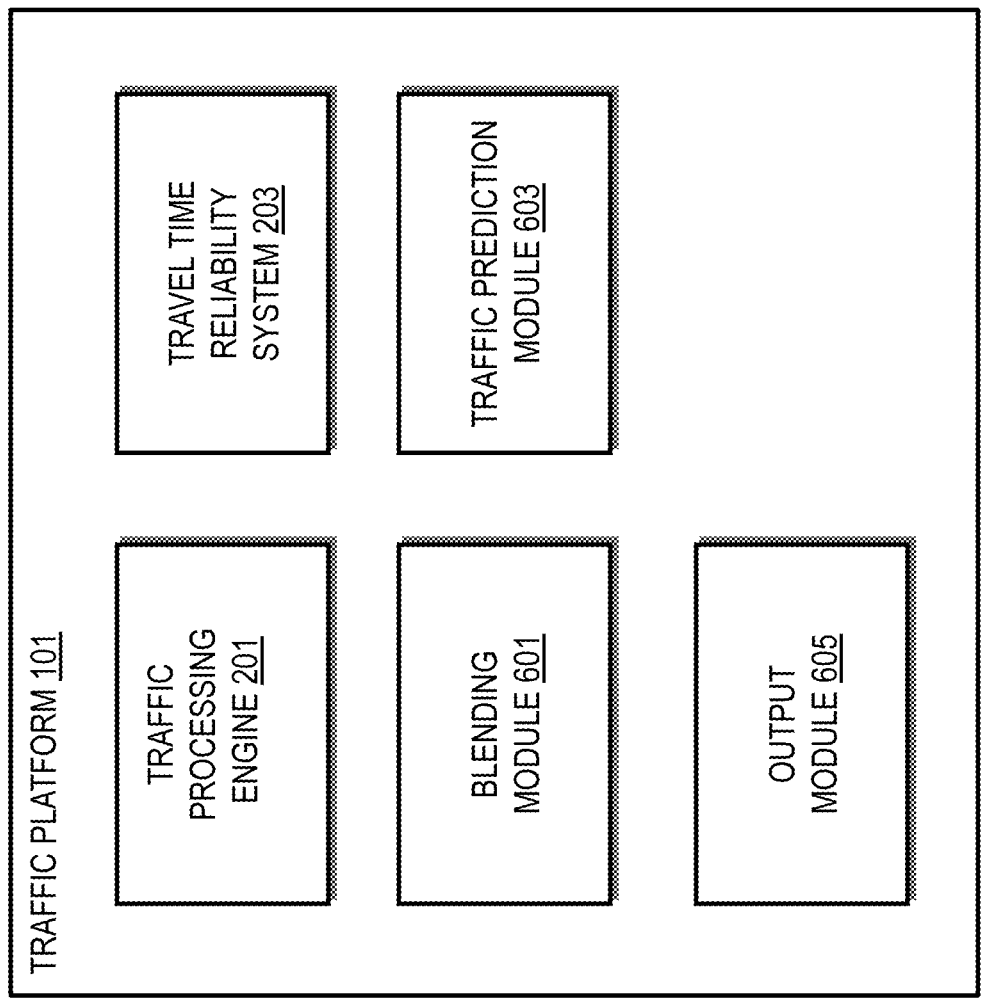
FIG. 6 is a diagram of a traffic platform, according to one embodiment.

FIG. 6 is a diagram of a traffic platform, according to one embodiment. In one embodiment, as shown in FIG. 6, the traffic platform 101 of the system 100 includes one or more components for determining map feature identification confidence levels for applications according to the various embodiments described herein. It is contemplated that the functions of the components of the traffic platform 101 may be combined or performed by other components of equivalent functionality. As shown, in one embodiment, the traffic platform 101 includes the traffic processing engine 201, the travel time reliability system 203, a blending module 601, a traffic prediction module 603, and an output module 605. The above presented modules and components of the traffic platform 101 can be implemented in hardware, firmware, software, or a combination thereof. Though depicted as a separate entity in FIG. 1, it is contemplated that the traffic platform 101 may be implemented as a module of any of the components of the system 100 (e.g., a component of the traffic flow and incident delivery system 107, the routing system 205, a machine learning system 119, the services platform 123, the services 125, the content providers 127, vehicles 109, UE 111, applications 113 of the UE 111, and/or the like). In another embodiment, one or more of the modules 601-605 may be implemented as a cloud-based service, local service, native application, or combination thereof. The functions of the traffic platform 101, the traffic processing engine 201, the travel time reliability system 203, and modules 601-605 are discussed with respect to the figures below.

Figure 11:
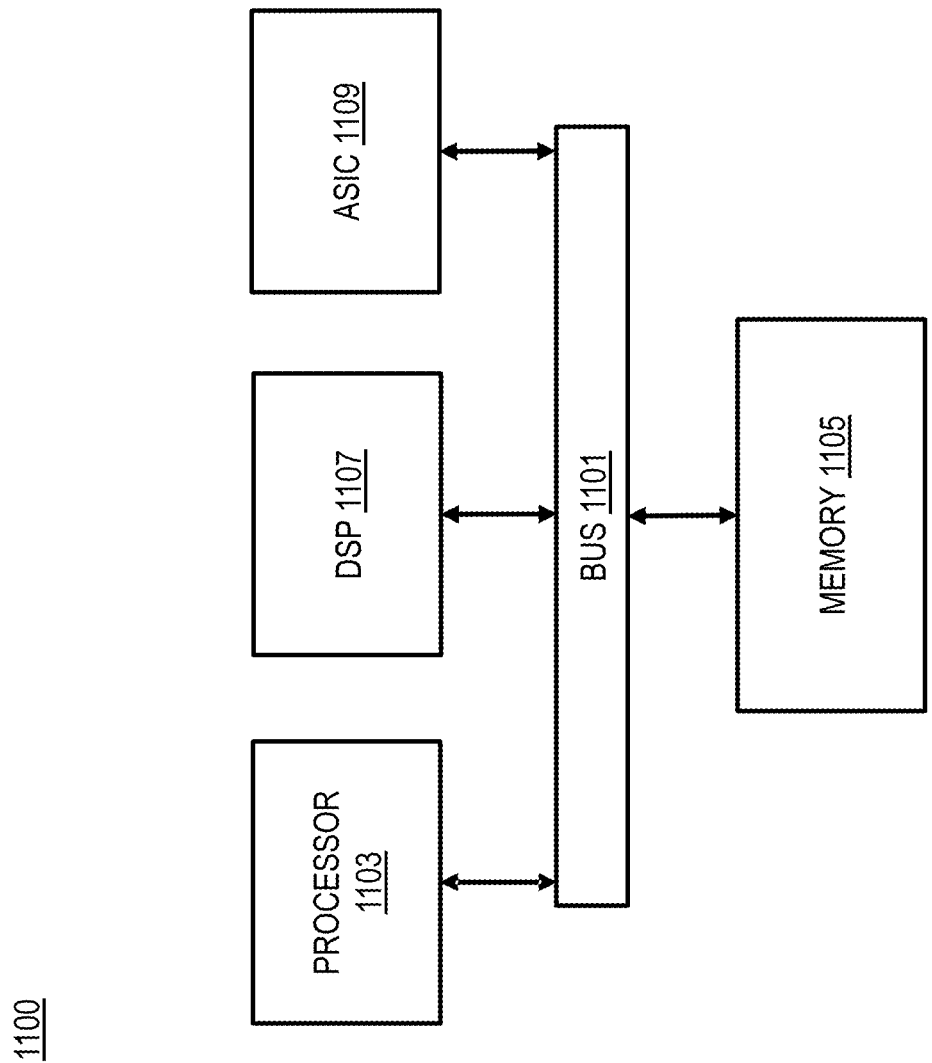
FIG. 11 is a diagram of a chip set that can be used to implement an embodiment of the processes described herein.

FIG. 7 is a flowchart of a process for traffic data blending based on road segment travel time reliability during traffic prediction, according to one embodiment. In various embodiments, the traffic platform 101, the traffic processing engine 201, the travel time reliability system 203, and/or any of the modules 601-605 may perform one or more portions of the process 700 and may be implemented in, for instance, a chip set including a processor and a memory as shown in FIG. 11. As such, the traffic platform 101, the traffic processing engine 201, the travel time reliability system 203, and/or any of the modules 601-605 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

In one embodiment, for example, in step 701, the traffic processing engine 201 can retrieve real-time traffic information (e.g., real time probe data of the probe data 103, TMC messages, non-well-formatted data (such as text (e.g., xml (extensible markup language), j son (JavaScript object notation), etc.), audio, video, etc.), historical traffic information (e.g., historical probe data of the probe data 103, historical non-well-formatted data, etc.), or a combination thereof for each road segment within a geographic area. As mentioned, the traffic information can include map artifact attributes, weather information, a traffic real-time flow, a traffic real-time incident, a road closure and construction, traffic historical pattern information, un-predictable event information, etc.

In one embodiment, in step 703, the traffic processing engine 201 can aggregate traffic flow speed data in the real-time traffic information to compute traffic pattern data (e.g., the traffic pattern data 209 in FIG. 2) for each road segment (e.g., the road segment 300 in FIG. 3), and the traffic pattern data can include static speed data of said each road segment (e.g., an average speed value provided in the last 15 minute interval of the road segment 300).

In one embodiment, in step 705, the travel time reliability system 203 can aggregate traffic flow speed data in the historical traffic information to compute one or more travel time reliability index metrics for said each road segment. For instance, the one or more travel time reliability index metrics can include Buffer Index (BI), Failure/On-Time Performance, 95th Planning Time Index, 80th Percentile Travel Time Index, Skew Statistics, Misery Index, etc.

For instance, the traffic flow speed data in the historical traffic information can be aggregated for said each road segment and per one or more predefined time windows in a day, back to a predefined time period (e.g., one year) to compute the one or more travel time reliability index metrics. For example, the one or more predefined time windows can be Weekday AM Peak (ham to 10 am), Weekday Midday (10 am to 4 pm), Weekday PM Peak (4 pm to 8 pm), Weekend (6 am to 8 pm).

In one embodiment, the travel time reliability system 203 can calculate the mean, the percentile (e.g., 50%, 80%, 9:5%, etc.), or a combination thereof of the road segment travel time distribution for said each road segment per the one or more predefined time windows. For instance, the one or more travel time reliability index metrics can be computed based on the mean, percentile, or a combination thereof of the road segment travel time distribution. In one embodiment, the travel time reliability system 203 can determine a road segment travel time reliability based on the one or more travel time reliability index metrics.

In one embodiment, in step 707, the blending module 601 can determine, based on the one or more travel time reliability index metrics, to use the traffic pattern data (e.g., the traffic pattern data 209), a mean, or a percentile of a road segment travel time distribution (e.g., of the road segment 300) in the historical traffic information for traffic prediction associated with said each road segment (e.g., by the traffic prediction module 603).

In some embodiments, the blending module 601 can either (1) blend the traffic pattern data (e.g., the traffic pattern data 209) or a first percentile (e.g., median) of the road segment travel time distribution with the real time traffic information for the traffic prediction, when the road segment travel time reliability is determined as reliable, or (2) blend the first percentile (i.e., the median) or a second percentile (e.g., 80%, 90%, 95%, etc.) of the road segment travel time distribution with the real time traffic information for the traffic prediction, when the road segment travel time reliability is determined as unreliable. In other words, when certain conditions (e.g., as shown in FIGS. 3B-3C) are met, median can be used for blending; otherwise, another percentile (e.g., 90%) can be used for blending.

In some embodiments, the blending module 601 can determine whether a delta between the traffic pattern data (e.g., the traffic pattern data 209) and the first percentile exceeds a threshold, and the traffic pattern data is blended for the traffic prediction when delta does not exceed the threshold, while the first percentile is blended for the traffic prediction when the delta exceeds the threshold. In other embodiments, the second percentile is blended for the traffic prediction when a root is known, and the first percentile is blended for the traffic prediction when the root cause is unknown.

In one embodiment, the travel time reliability system 203 can determine the root cause of the road segment travel time reliability being determined as unreliable based on that the one or more travel time reliability index metrics exceed one or more thresholds associated with one or more input event resources in the historical traffic information. For instance, the root cause is a work zone, weather, special event, incident, traffic control, demand variability, or lack of base capacity.

In one embodiment, the blending module 601 can provide the road segment travel time distribution for traffic prediction, when the first percentile or the second percentile is blended for the traffic prediction by the traffic prediction module 603.

In one embodiment, the machine learning system 119 can train a machine learning model to determine travel time reliability index metrics for a road segment. In one embodiment, the machine learning system 119 can select respective factors such as probe data, sensor data, map data, driving behaviors, vehicle state data, transport modes, ride hailing data, ride sharing data, traffic patterns, road topology, etc., to determine a travel time reliability index machine learning model. In one embodiment, the machine learning system 119 can select or assign respective weights, correlations, relationships, etc. among the factors, to determine machine learning models for different vehicle(s)/fleets, etc. In one instance, the machine learning system 119 can continuously provide and/or update the machine learning models (e.g., a support vector machine (SVM), neural network, decision tree, etc.) during training using, for instance, supervised deep convolution networks or equivalents. In other words, the machine learning system 119 can train the machine learning models using the respective weights of the factors to most efficiently select optimal factors/weightings for different scenarios in different regions.

In another embodiment, the machine learning system 119 includes a neural network or other system to compare (e.g., iteratively) driver behavior patterns, vehicle paths features, etc. to determine travel time reliability indexes. In one embodiment, the neural network of the machine learning system is a traditional convolutional neural network which consists of multiple layers of collections of one or more neurons (which are configured to process a portion of an input data). In one embodiment, the machine learning system 119 also has connectivity or access over the communication network 121 to the traffic data 105 and/or the geographic database 117.

In one embodiment, the machine learning system 119 can improve the process 700 using feedback loops based on, for example, user/vehicle behavior and/or feedback data (e.g., from passengers). In one embodiment, the machine learning system 119 can improve the machine learning models using user/vehicle behavior and/or feedback data as training data. For example, the machine learning system 119 can analyze correctly identified travel time reliability index data, missed travel time reliability index data, etc. to determine the performance of the machine learning models.

In one embodiment, the output module 605 can provide the one or more travel time reliability index metrics, the traffic prediction, or a combination thereof as an output. In one embodiment, the output module 605 can process the output in conjunction with an external system (e.g., the routing system 205, etc.) to perform at least one of: providing navigation routing data to a vehicle, a user, or a combination thereof, fleet management, and vehicle dispatch.

Figure 8A:
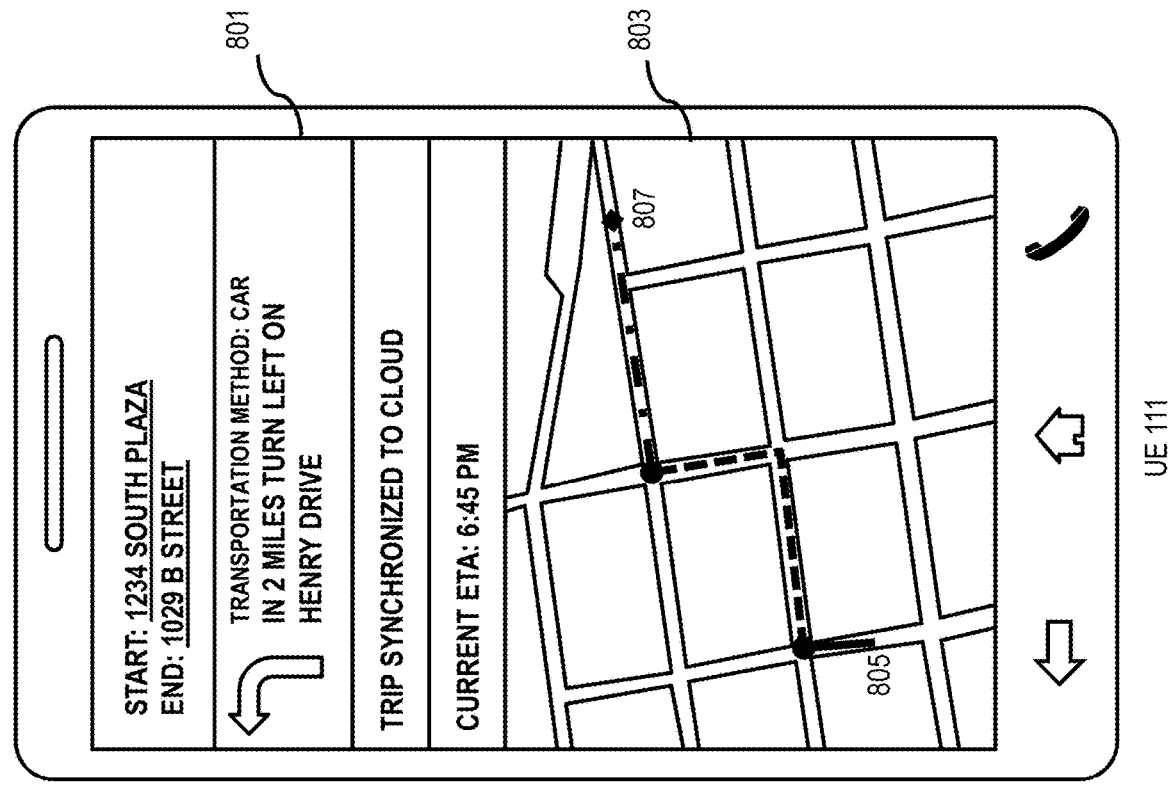
FIGS. 8A-8B are user interface diagrams that represent a scenario wherein a user is presented with a real-time estimate of the arrival time, according to one embodiment.
Figure 8B:
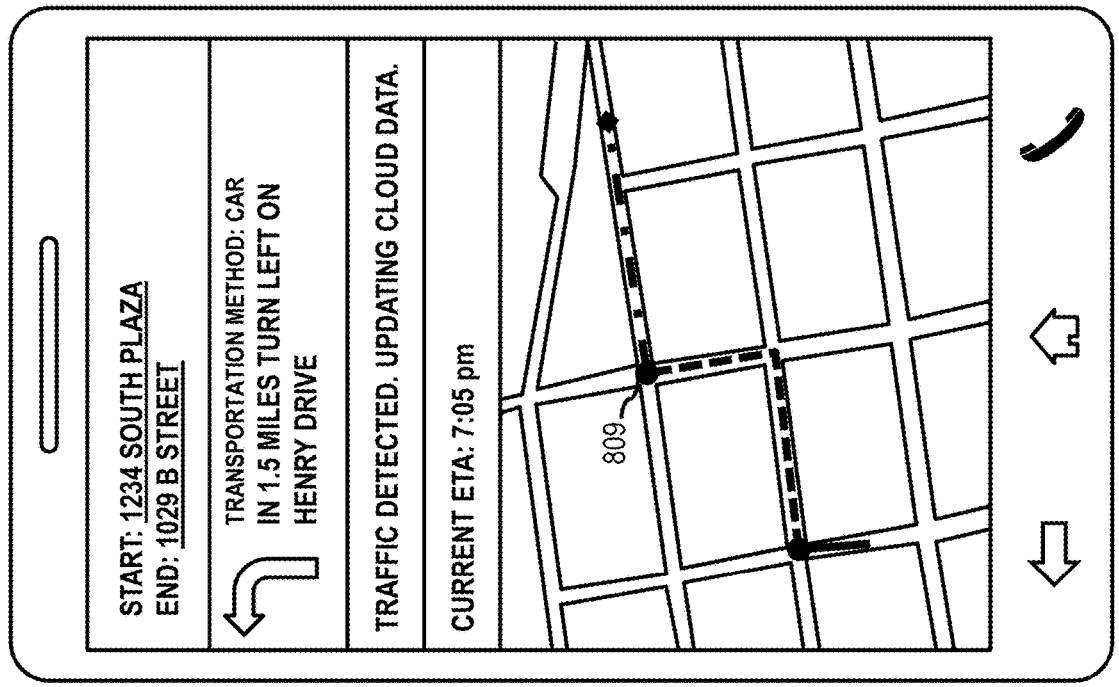

FIGS. 8A-8B are user interface diagrams that represent a scenario wherein a user is presented with a real-time estimate of the arrival time, according to one embodiment. In FIG. 8A, a user plans a trip from 1234 South Plaza to 1029 B street by car. Since the vehicle movement is synchronized with the system 100, the system 100 can estimate and update time of arrival based on real-time traffic prediction based on traffic data blended as described in the above-mentioned embodiments. In this example, the user interface (UI) 801 shown may be generated for a UE 111 (e.g., a mobile device, an embedded navigation system of the vehicle 109, a server of a vehicle fleet operator, a server of a vehicle insurer, etc.) that depicts a map 803, an origin 805, a destination 807, and information including origin/destination address, driving directions, trip synchronization status, and the current estimate time of arrival (e.g., 6:45 pm). In FIG. 9B, the system 100 detects traffic when the vehicle is at the location 809, and estimates the arrival time based on the traffic conditions, vehicular speed, user activities etc. based on traffic data blended as described in the above-mentioned embodiments. In FIG. 8B, the UI 901 shows the current vehicle location 809 in the map 803, and updates the displayed information with continuing driving directions, traffic detected, and a new estimated time of arrival (e.g., 7:05 pm). In one embodiment, the system 100 can set different users with different access rights to different vehicle state statistics as well as different granular levels within each data feature.

In another embodiment, the system 100 may be configured to dynamically, in real-time, or substantially in real-time, adjust the displayed information based on driver behavior changes and display on the UI 801 accordingly. In yet another embodiment, the system 100 may be configured to dynamically, in real-time, or substantially in real-time, adjust the displayed information based on other contextual changes in weather, traffic, fuel costs, etc.

In other embodiments, the one or more travel time reliability index metrics and/or the traffic prediction can be transmitted over a communications network 121 to the service platform 123 the services 125. The services 125 can include, but are not limited to, mapping services, navigation services, ride-haling services, ride sharing services, parking services, vehicle insurance services, and/or the like that can combine with digital map data (e.g., a geographic database 117) to provide location-based services. It is also contemplated that the services 125 can include any service that uses the one or more travel time reliability index metrics and/or the traffic prediction to provide or perform any function. In one embodiment, the one or more travel time reliability index metrics and/or the traffic prediction can also be used by the content providers 127. These content providers 127 can aggregate and/or process the one or more travel time reliability index metrics and/or the traffic prediction to provide the processed data to its users such as the services platform 123 and/or the services 125. The one or more travel time reliability index metrics and/or the traffic prediction cab be stored in a stand-alone database, or a geographic database 117 that also stores map data.

Returning to FIG. 1, the system 100 comprises one or more vehicles 109 associated with one or more UEs 111 having respective vehicle event modules 117 and/or connectivity to the traffic platform 101. The UE 111 can be mounted to the dashboard or other fixed position within the vehicle 109 or carried by a driver/passenger of the vehicle 109. By way of example, the UEs 111 may be a personal navigation device ("PND"), a cellular telephone, a mobile phone, a personal digital assistant ("PDA"), a watch, a camera, a computer, an in-vehicle or embedded navigation system, and/or other device that is configured with multiple sensor types (e.g., accelerometers, gyroscope, magnetometers, camera, etc.) that can be used for determined vehicle speed according to the embodiments described herein. It is contemplated, that the UE 111 (e.g., cellular telephone or other wireless communication device) may be interfaced with an on-board navigation system of an autonomous vehicle or physically connected to the vehicle 109 for serving as a navigation system. Also, the UEs 111 and/or vehicles 109 may be configured to access the communications network 121 by way of any known or still developing communication protocols. Via this communications network 121, the UEs 111 and/or vehicles 109 may transmit sensor data for facilitating vehicle speed calculations.

The UEs 111 and/or vehicles 109 may be configured with multiple sensors of different types for acquiring and/or generating sensor data according to the embodiments described herein. For example, sensors may be used as GPS or other positioning receivers for interacting with one or more location satellites to determine and track the current speed, position and location of a vehicle travelling along a roadway. In addition, the sensors may gather IMU data, NFC data, Bluetooth data, acoustic data, barometric data, tilt data (e.g., a degree of incline or decline of the vehicle during travel), motion data, light data, sound data, image data, weather data, temporal data and other data associated with the vehicle and/or UEs 111 thereof. Still further, the sensors may detect local or transient network and/or wireless signals, such as those transmitted by nearby devices during navigation of a vehicle along a roadway. This may include, for example, network routers configured within a premise (e.g., home or business), another UE 111 or vehicle 109 or a communicable traffic system (e.g., traffic lights, traffic cameras, traffic signals, digital signage).

By way of example, the traffic platform 101 may be implemented as a cloud-based service, hosted solution or the like for performing the above-described functions. Alternatively, the traffic platform 101 may be directly integrated for processing data generated and/or provided by the services platform 123, the services 125, and/or the content providers 127. Per this integration, the traffic platform 101 may perform client-side state computation of traffic prediction.

By way of example, the communications network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 111 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.).

By way of example, the UE 111s, the traffic platform 101, the services platform 123, and the content providers 127 communicate with each other and other components of the communications network 121 using well known, new or still developing protocols. In this context, a protocol includes a set of rules defining how the network nodes within the communications network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
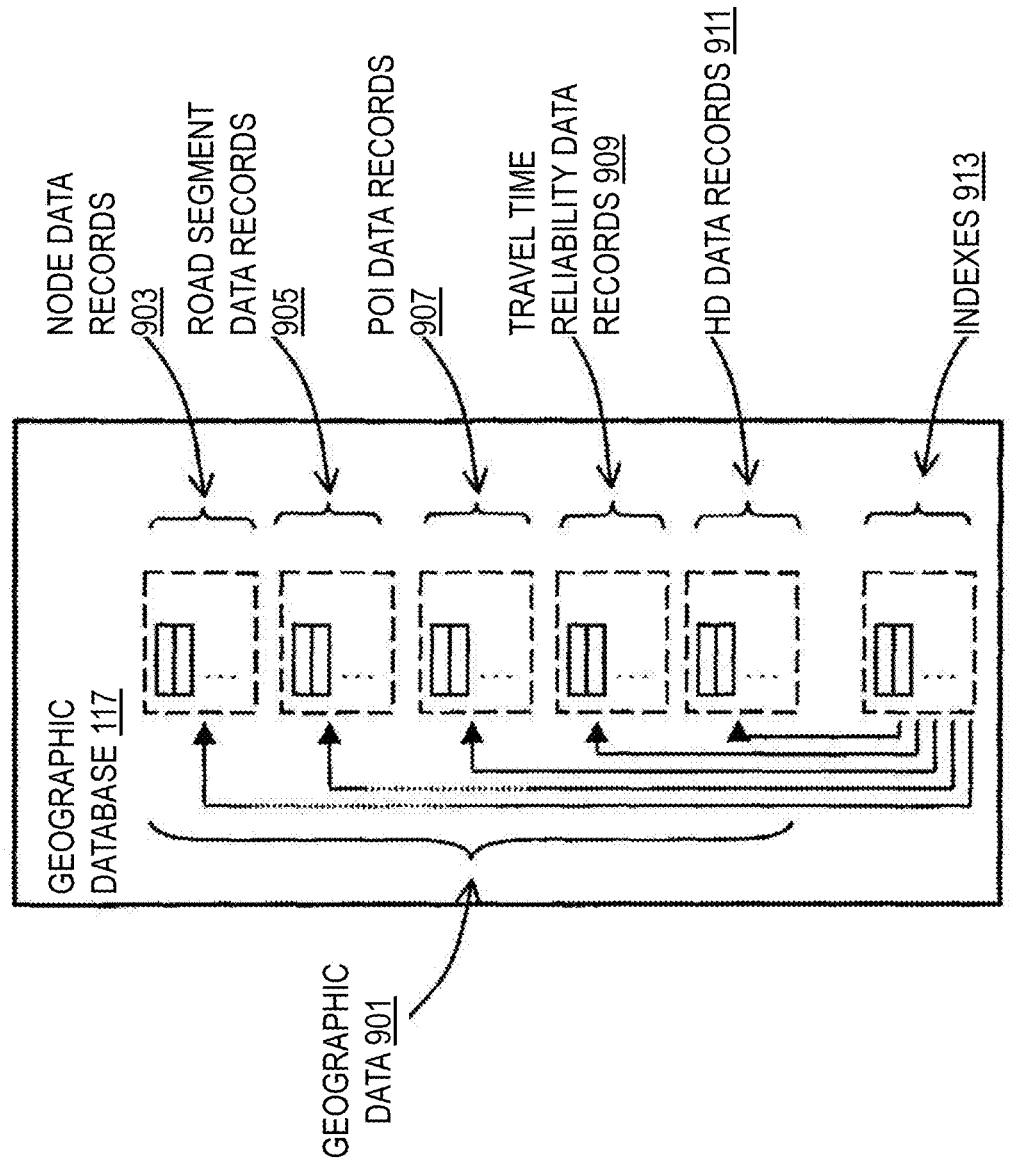
FIG. 9 is a diagram of a geographic database, according to one embodiment.

FIG. 9 is a diagram of a geographic database (such as the database 117), according to one embodiment. In one embodiment, the geographic database 117 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 117 include high resolution or high definition (HD) mapping data that provide centimeter-level or better accuracy of map features. For example, the geographic database 117 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 911) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 117.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node. Also, there are no duplicated shape points, nodes, or links. Two links that connect each other have a common node. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 117 includes node data records 903, road segment or link data records 905, POI data records 907, travel time reliability data records 909, mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 117. In one embodiment, the indexes 913 may be used to quickly locate data without having to search every row in the geographic database 117 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points (such as intersections) corresponding to the respective links or segments of the road segment data records 905. The road link data records 905 and the node data records 903 represent a road network, such as used by vehicles, cars, and/or other entities. Alternatively, the geographic database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 907. The geographic database 117 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city). In one embodiment, certain attributes, such as lane marking data records, mapping data records and/or other attributes can be features or layers associated with the link-node structure of the database.

In one embodiment, the geographic database 117 can also include travel time reliability data records 909 for storing traffic flow speed data, traffic pattern data per road segment, road segment travel time distribution data, travel time reliability index metrics, traffic prediction data, training data, prediction models, annotated observations, computed featured distributions, sampling probabilities, and/or any other data generated or used by the system 100 according to the various embodiments described herein. By way of example, the travel time reliability data records 909 can be associated with one or more of the node records 903, road segment records 905, and/or POI data records 907 to support localization or visual odometry based on the features stored therein and the corresponding estimated quality of the features. In this way, the records 909 can also be associated with or used to classify the characteristics or metadata of the corresponding records 903, 905, and/or 907.

In one embodiment, as discussed above, the mapping data records 911 model road surfaces and other map features to centimeter-level or better accuracy. The mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 911 are divided into spatial partitions of varying sizes to provide mapping data to vehicles 109 and other end user devices with near real-time speed without overloading the available resources of the vehicles 109 and/or devices (e.g., computational, memory, bandwidth, etc. resources).

In one embodiment, the mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 911.

In one embodiment, the mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 117 can be maintained by the content provider 127 in association with the services platform 123 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle (e.g., vehicles 109 and/or UE 111) along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 109 or a UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for traffic data blending based on road segment travel time reliability during traffic prediction may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
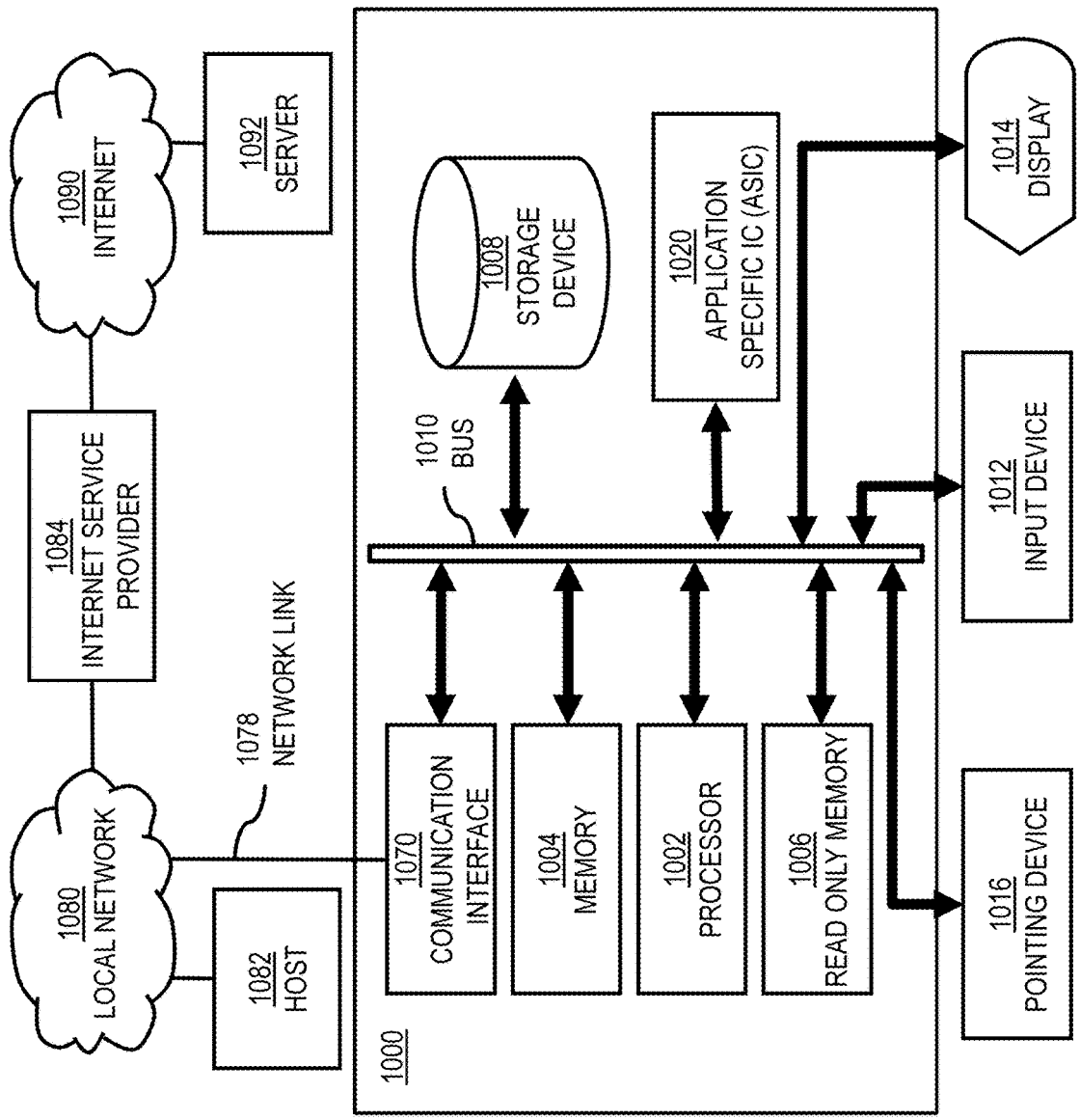
FIG. 10 is a diagram of hardware that can be used to implement an embodiment of the processes described herein.

FIG. 10 illustrates a computer system 1000 upon which an embodiment of the invention may be implemented. Computer system 1000 is programmed (e.g., via computer program code or instructions) to blend traffic data based on road segment travel time reliability during traffic prediction as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to traffic data blending based on road segment travel time reliability during traffic prediction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for traffic data blending based on road segment travel time reliability during traffic prediction. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for traffic data blending based on road segment travel time reliability during traffic prediction, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 121 for traffic data blending based on road segment travel time reliability during traffic prediction.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to blend traffic data based on road segment travel time reliability during traffic prediction as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to blend traffic data based on road segment travel time reliability during traffic prediction. The memory 1105 also stores the data associated with or generated by the execution of the inventive steps.

Figure 12:
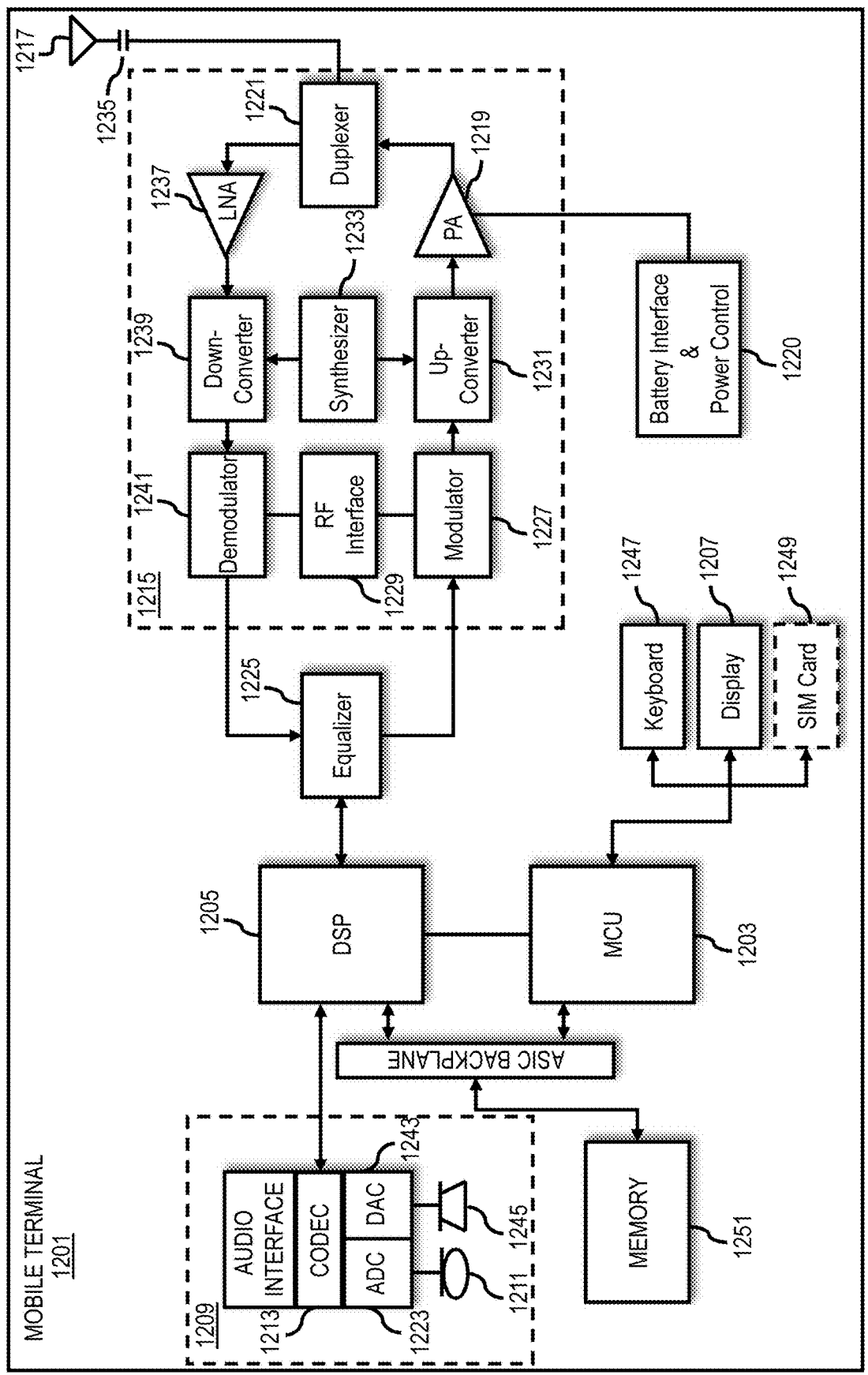
FIG. 12 is a diagram of a terminal that can be used to implement an embodiment of the processes described herein.

FIG. 12 is a diagram of exemplary components of a mobile terminal 1201 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to blend traffic data based on road segment travel time reliability during traffic prediction. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    using one or more location sensors of one or more devices, one or more vehicles, or a combination thereof to collect real-time probe data for each road segment within a geographic area, wherein the real-time probe data is provided as real-time traffic information, wherein the one or more location sensors are based on satellite positioning, inertial measurement, wireless signals, or a combination thereof;
    retrieving historical traffic information for said each road segment;
    in real time, aggregating traffic flow speed data in the real-time traffic information to compute traffic pattern data for each road segment, wherein the traffic pattern data includes static speed data of said each road segment;
    in real time, aggregating traffic flow speed data in the historical traffic information to compute a first travel time reliability index metric using a first index methodology and a second travel time reliability index metric using a second index methodology that is different from the first index methodology for said each road segment, wherein the first travel time reliability index metric and the second travel time reliability index metric are computed to indicate a consistency in a plurality of travel times in the historical traffic information from day-to-day, across different times of day, or a combination thereof; and
    in real time, determining, based on the first travel time reliability index metric and the second travel time reliability index metric, to use the traffic pattern data, a mean, or a percentile of a road segment travel time distribution in the historical traffic information for traffic prediction associated with said each road segment.

2. The method of claim 1, wherein the traffic flow speed data in the historical traffic information is aggregated for said each road segment and per one or more predefined time windows in a day, back to a predefined time period to compute the first travel time reliability index metric and the second travel time reliability index metric.

3. The method of claim 2, further comprising:
calculating the mean, the percentile, or a combination thereof of the road segment travel time distribution for said each road segment per time window,
wherein the first travel time reliability index metric and the second travel time reliability index metric are computed based on the mean, the percentile, or a combination thereof of the road segment travel time distribution.

4. The method of claim 3, further comprising:
determining a road segment travel time reliability based on the first travel time reliability index metric and the second travel time reliability index metric and
either (1) blending the traffic pattern data or a first percentile of the road segment travel time distribution with the real time traffic information for the traffic prediction, when the road segment travel time reliability is determined as reliable,
or (2) blending the first percentile or a second percentile of the road segment travel time distribution with the real time traffic information for the traffic prediction, when the road segment travel time reliability is determined as unreliable.

5. The method of claim 4, further comprising:
determining whether a delta between the traffic pattern data and the first percentile exceeds a threshold,
wherein the traffic pattern data is blended for the traffic prediction when delta does not exceed the threshold, and the first percentile is blended for the traffic prediction when the delta exceeds the threshold.

6. The method of claim 4, further comprising:
determining a root cause of the road segment travel time reliability being determined as unreliable based on a determination that the first travel time reliability index metric and the second travel time reliability index metric exceed one or more thresholds associated with one or more input event resources in the historical traffic information,
wherein the root cause is a work zone, weather, special event, incident, traffic control, demand variability, or lack of base capacity.

7. The method of claim 6, wherein the second percentile is blended for the traffic prediction when a cause of the unreliable is known, and the first percentile is blended for the traffic prediction when the root cause is unknown.

8. The method of claim 4, further comprising:
providing the road segment travel time distribution for traffic prediction, when the first percentile or the second percentile is blended for the traffic prediction.

9. The method of claim 1, further comprising:
providing the first travel time reliability index metric, the second travel time reliability index metric, the traffic prediction, or a combination thereof as an output.

10. The method of claim 1, further comprising:
training a machine learning model to determine the first travel time reliability index metric and the second travel time reliability index metric for said each road segment.

11. The method of claim 9, further comprising:
processing the output to perform at least one of:
providing navigation routing data to a vehicle, a user, or a combination thereof,
fleet management, and
vehicle dispatch.

12. An apparatus comprising:
at least one processor; and
at least one memory including computer program code for one or more programs,
the at least one memory and the computer program code configured to, with the at least one processor, cause the apparatus to perform at least the following,
use one or more location sensors of one or more devices, one or more vehicles, or a combination thereof to collect real-time probe data for each road segment within a geographic area, wherein the real-time probe data is provided as real-time traffic information, wherein the one or more location sensors are based on satellite positioning, inertial measurement, wireless signals, or a combination thereof;
retrieve historical traffic information for each road segment;
in real time, aggregate traffic flow speed data in the real-time traffic information to compute traffic pattern data for each road segment, wherein the traffic pattern data includes static speed data of said each road segment, and wherein the static speed data includes an average speed over a designated interval of time;
in real time, aggregate traffic flow speed data in the historical traffic information to compute one or more travel time reliability index metrics for said each road segment, wherein the one or more travel time reliability index metrics is computed to indicate a consistency in a plurality of travel times in the historical traffic information from day-to-day, across different times of day, or a combination thereof; and
in real time, determine, based on the one or more travel time reliability index metrics, to use the traffic pattern data, a mean, or a percentile of a road segment travel time distribution in the historical traffic information for traffic prediction associated with said each road segment.

13. The apparatus of claim 12, wherein the traffic flow speed data in the historical traffic information is aggregated for said each road segment and per one or more predefined time windows in a day, back to a predefined time period to compute the first travel time reliability index metric and the second travel time reliability index metric.

14. The apparatus of claim 13, wherein the apparatus is further caused to:
calculate the mean, the percentile, or a combination thereof of the road segment travel time distribution for said each road segment per time window,
wherein the first travel time reliability index metric and the second travel time reliability index metric are computed based on the mean, percentile, or a combination thereof of the road segment travel time distribution.

15. The apparatus of claim 14, wherein the apparatus is further caused to:
determine a road segment travel time reliability based on the first travel time reliability index metric and the second travel time reliability index metric, and
either (1) blend the traffic pattern data or a first percentile of the road segment travel time distribution with the real time traffic information for the traffic prediction, when the road segment travel time reliability is determined as reliable,
or (2) blend the first percentile or a second percentile of the road segment travel time distribution with the real time traffic information for the traffic prediction, when the road segment travel time reliability is determined as unreliable.

16. The apparatus of claim 15, wherein the apparatus is further caused to:
    determine whether a delta between the traffic pattern data and the first percentile exceeds a threshold,
    wherein the traffic pattern data is blended for the traffic prediction when delta does not exceed the threshold, and the first percentile is blended for the traffic prediction when the delta exceeds the threshold.

17. The apparatus of claim 15, wherein the apparatus is further caused to:
    provide the road segment travel time distribution for traffic prediction, when the first percentile or the second percentile is blended for the traffic prediction.

18. A non-transitory computer-readable storage medium carrying one or more sequences of one or more instructions which, when executed by one or more processors, cause an apparatus to perform:
    using one or more location sensors of one or more devices, one or more vehicles, or a combination thereof to collect real-time probe data for each road segment within a geographic area, wherein the real-time probe data is provided as real-time traffic information, wherein the one or more location sensors are based on satellite positioning, inertial measurement, wireless signals, or a combination thereof;
    retrieving real-time traffic information, historical traffic information, or a combination thereof for each road segment within a geographic area;
    in real time, aggregating traffic flow speed data in the real-time traffic information to compute traffic pattern data for each road segment, wherein the traffic pattern data includes static speed data of each said road segment;
    in real time, aggregating traffic flow speed data in the historical traffic information to compute one or more travel time reliability index metrics for each said road segment, wherein the one or more travel time reliability index metrics is computed to indicate a consistency in a plurality of travel times in the historical traffic information from day-to-day, across different times of day, or a combination thereof; and
    in real time, determining, based on the one or more travel time reliability index metrics, to use the traffic pattern data, a mean, or a percentile of a road segment travel time distribution in the historical traffic information for traffic prediction associated with each said road segment.

19. The non-transitory computer-readable storage medium of claim 18, wherein the traffic flow speed data in the historical traffic information is aggregated for said each road segment and per one or more predefined time windows in a day, back to a predefined time period to compute the first travel time reliability index metric and the second travel time reliability index metric.

20. The non-transitory computer-readable storage medium of claim 19, wherein the apparatus is caused to further perform:
    calculating the mean, the percentile, or a combination thereof of the road segment travel time distribution for each said road segment per time window,
    wherein the first travel time reliability index metric and the second travel time reliability index metric are computed based on the mean, percentile, or a combination thereof of the road segment travel time distribution.

* * * * *